(12) United States Patent
Ormond et al.

(10) Patent No.: US 10,866,774 B1
(45) Date of Patent: Dec. 15, 2020

(54) DEVICE POWER SAVING BY INTELLIGENT DOCUMENT PRINT QUEUING

(71) Applicant: Toshiba TEC Kabushiki Kaisha, Shinagawa-ku (JP)

(72) Inventors: Louis M. Ormond, Irvine, CA (US); John X. Garred, Willowick, OH (US)

(73) Assignee: Toshiba TEC Kabushiki Kaisha, Shinagawa-ku (JP)

( * ) Notice: Subject to any disclaimer, the term of this patent is extended or adjusted under 35 U.S.C. 154(b) by 0 days.

(21) Appl. No.: 16/553,286

(22) Filed: Aug. 28, 2019

(51) Int. Cl.
*G06F 3/12* (2006.01)
*H04N 1/00* (2006.01)

(52) U.S. Cl.
CPC .......... *G06F 3/1263* (2013.01); *G06F 3/1212* (2013.01); *G06F 3/1215* (2013.01); *H04N 1/00896* (2013.01)

(58) Field of Classification Search
None
See application file for complete search history.

(56) References Cited

U.S. PATENT DOCUMENTS

| 9,575,694 | B1* | 2/2017 | Khafizova | G06F 3/1285 |
| 2011/0007338 | A1* | 1/2011 | Kawanishi | G06F 3/1286 358/1.14 |

\* cited by examiner

*Primary Examiner* — Andrew H Lam
(74) *Attorney, Agent, or Firm* — Ulmer & Berne LLP

(57) ABSTRACT

A system and method for power management by intelligent print queue management includes a processor and a memory storing a print job queue. The memory also stores data corresponding to a plurality of users associated history of printed document pickup times relative to their print job transmission time. A network interface receives print jobs into the queue and the processor determines an anticipated pickup time for a printout of the first print job to be picked up in accordance with history data, and schedules printing of the first print job in accordance its associated, anticipated job pickup time such that the print job is printed before that time, factoring in a device warmup time and time to print the first print job.

14 Claims, 7 Drawing Sheets

DEVICE POWER SAVING BY INTELLIGENT DOCUMENT PRINT QUEUING

TECHNICAL FIELD

This application relates generally to printing of documents with printers having a power saving mode. The application relates more particularly to intelligent queuing of electronic documents while a printer is in power saving mode.

BACKGROUND

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

MFPs may include a sleep or power saving mode when the device is not in use and some device functionality is suspended. In a particular example, MFPs may print using toner that must ultimately be fused to paper, such as with pressure from a heated roller. When a device is in power saving mode, a fuser heating element, such as a fuser roller, may be turned off, or a temperature turned lower that that required for printing. In that event, when a print job arrives, the MFP must commence a device warmup and suspend printing of the job until the fuser is at the appropriate temperature. When the job finally does print, the device may stay in ready-to-print mode for a preset time period. Any document that arrives for printing while the MFP is in ready-to-print mode can print immediately. If the preset time period passes, the MFP reenters power saving mode, and the warmup process will begin again when the next job arrives.

BRIEF DESCRIPTION OF THE DRAWINGS

Various embodiments will become better understood with regard to the following description, appended claims and accompanying drawings wherein:

DETAILED DESCRIPTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Operation of an MFP in and out of power saving mode, as noted above, can cause a user excess wait time as they wait for device warmup and subsequent printing of their job. In other instances, such as when an MFP is shared by many networked users, jobs can arrive at different times, and each time the MFP is in power saving mode, it immediately warms up and then prints the document. If users do not pick up their print jobs quickly, many printouts can accumulate over time, many or all of which were subject to their own warmup and print period as they arrived when the MFP had already returned to power saving mode. This can result in substantial power usage, even with use of a power saving mode.

In accordance with example embodiments described herein, a system job queue is managed a way that optimizes energy usage based on both user settings and historic data. In a particular example embodiment, software on a MFP printing device checks against an energy saving timer, attributes of the print job itself, user settings, and historical print job data when a new print job is submitted. A value is calculated for any queued print job. Based on the user specified criteria or the calculated value, the device will either execute the jobs immediately or hold the jobs in the queue. A subsequent job submitted to the device will trigger the reevaluation of all held jobs. If the new conditions meet selected threshold criteria, held jobs will be released for printing. A user may manually override this function through an action on the front panel of the printing device or with a print immediately command sent along with their print job. Logs of the actions taken by the software and user are suitably kept for audits.

Although the above implementation references printing devices, the methodology is applicable to any system that incorporates a queue of any sort. For example, a fast food restaurant that takes orders ahead for pick-up will be able to optimize their cook order queue by applying order and customer data in a similar way.

Figure 1:
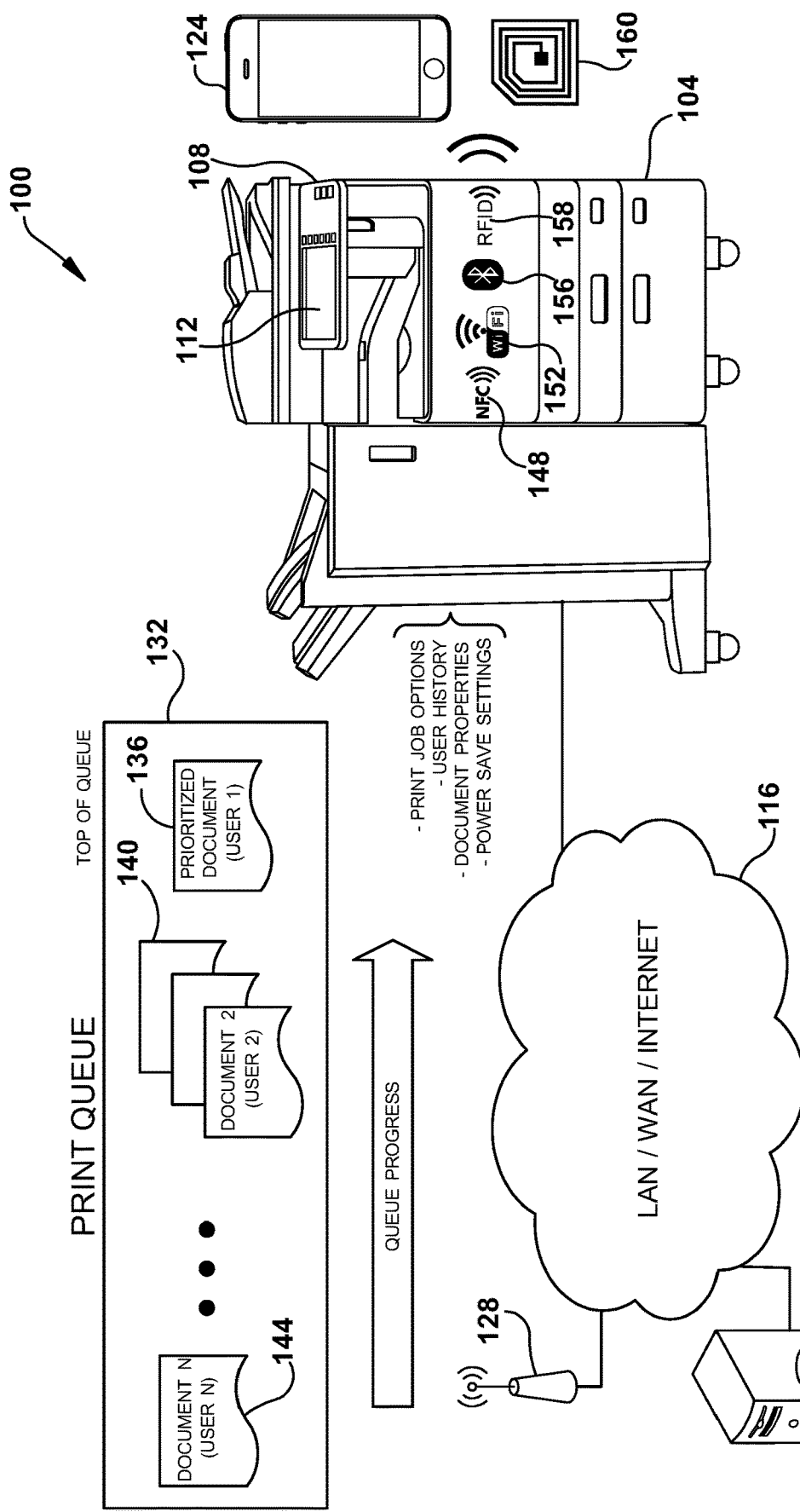
FIG. 1 is an example embodiment of an intelligent print queue management system.

In accordance with the subject application, FIG. 1 illustrates an example intelligent print queue management system 100 that includes one or more MFPs, illustrated by way of example by MFP 104. MFP 104 includes a user interface 108 suitably comprised of touchscreen 112. MFP 104 is in network communication with network cloud 116, suitably comprised of any wireless or wired local area network (LAN) or a wide area network (WAN) which can comprise the Internet, or any suitable combination thereof. Also in network communication are one or more digital devices including, for example server 120 or smartphone 124, or any other suitable device. In the illustrated example embodiment, smartphone 124 is in wireless network communication via Wi-Fi access point 128. MFP 104 is associated with a print queue 132 for incoming print jobs. Print queue 132 is suitably resident on MFP 104, server 120 or any other suitable networked digital device. One or more documents are resident in print queue 132, such as documents 136, 140 and 144. In the illustrated example, print jobs in queue 132 are placed in a prioritized order for printing, or deferred printing, based on factors such as print job options, user history for a user sending a print job, properties of a print job or power saving settings on MFP 104. Prioritization and printing for print queue 132 are detailed further below.

MFP 104 includes wireless data communication capabilities, including a near field commination (NFC) interface 148, a Wi-Fi interface 152, which may comprise a Wi-Fi direct interface, a Bluetooth interface 156 or an RFID interface 158. Complementary wireless interfaces are disposed with smartphone 124. Interfaces are suitably added to smartphone 124, such as RFID interface 160, when not present in a factory configured smartphone. When a user approaches MFP 104 to pick up their printed job, it may have already printed and is waiting for them. As detailed below, example embodiments herein do not simply start an MFP device warmup from sleep, or power saving mode as soon as a print job is received while in sleep mode. In such situations, the user may release their job to printing by selecting their job on user interface 108. Alternatively, MFP 104 can sense when a user is proximate via one or more wireless interfaces, identify the user and proceed to commence immediate printing of the user's job by prioritizing the user's print job, illustrated as document 136 of queue 132. Printing will be done after a device warmup, if required. In another example embodiment, a user biometric suitably informs MFP 104 as to a user being proximate. Such biometric is suitably relayed via smartphone 124 via the devices integrated camera, fingerprint sensor, microphone, haptic sensor, or the like.

Figure 2:
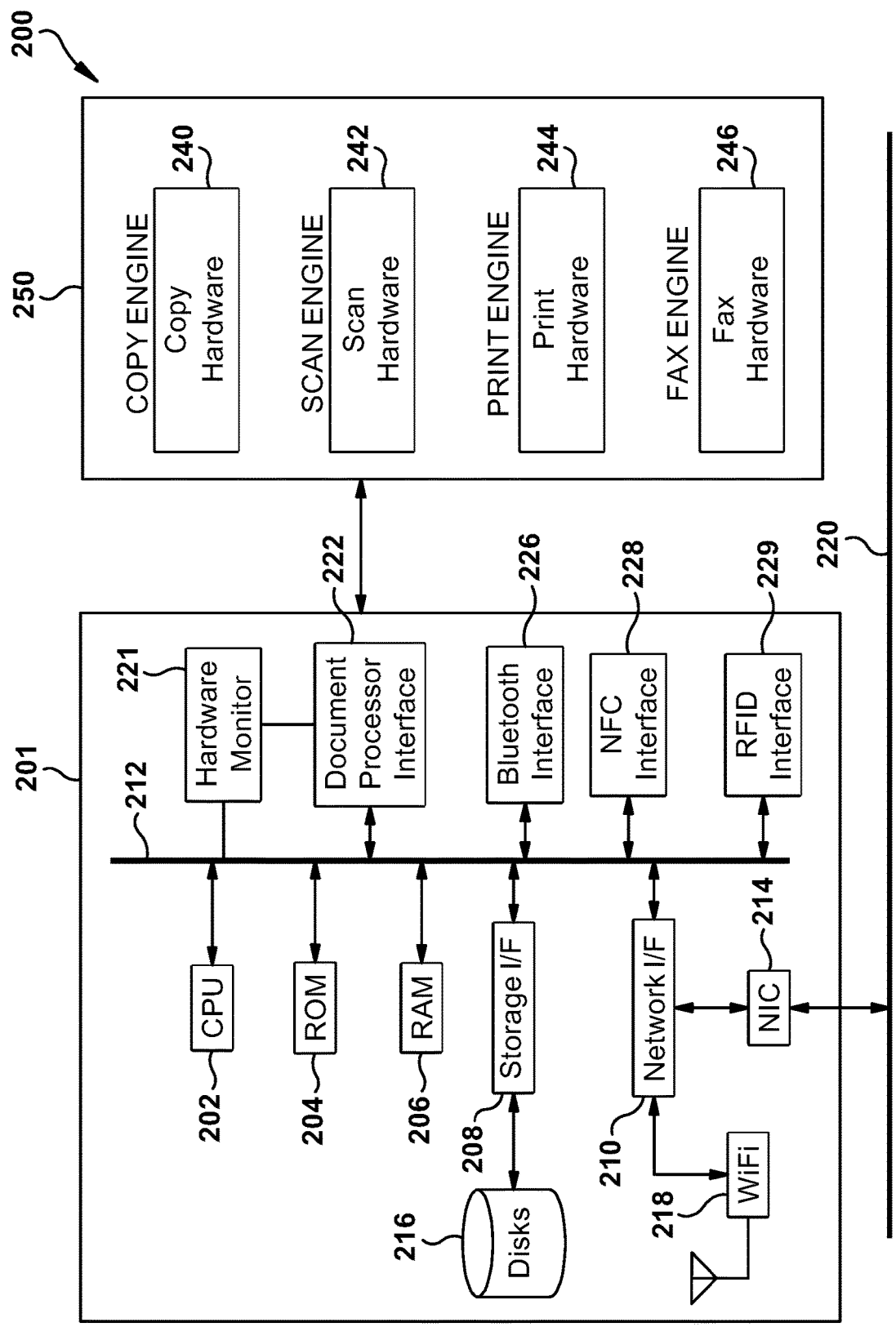
FIG. 2 is an example embodiment of a networked digital device such as a multifunction peripheral.

Turning now to FIG. 2 illustrated is an example embodiment of a networked digital device comprised of document rendering system 200 suitably comprised within an MFP, such as with MFPs 104 of FIG. 1. It will be appreciated that an MFP includes an intelligent controller 201 which is itself a computer system. Included in controller 201 are one or more processors, such as that illustrated by processor 202. Each processor is suitably associated with non-volatile memory, such as read only memory (ROM) 204, and random access memory (RAM) 206, via a data bus 212.

Processor 202 is also in data communication with a storage interface 208 for reading or writing data with storage 216, suitably comprised of a hard disk, optical disk, solid-state disk, cloud-based storage, or any other suitable data storage as will be appreciated by one of ordinary skill in the art.

Processor 202 is also in data communication with a network interface 210 which provides an interface to a network interface controller (NIC) 214, which in turn provides a data path to any suitable wired or physical network connection 220, or to a wireless data connection via a wireless network interface, such as WiFi 218. Example wireless connections include cellular, Wi-Fi, wireless universal serial bus (wireless USB), satellite, and the like. Example wired interfaces include Ethernet, USB, IEEE 1394 (FireWire), Lightning, telephone line, or the like. Processor 202 is also in data communication with a hardware monitor 221, suitably amassing state data from subassemblies, sensors, digital thermometers, or the like, and suitably including digital state date including device codes, such as device error codes. Processor 202 can also be in data communication a document processor interface 222, with BLUETOOTH interface 226, NFC interface 228 and RFID interface 229 via data path 212.

Processor 202 can also be in data communication with any suitable user input/output (I/O) interface (not shown) which provides data communication with user peripherals, such as displays, keyboards, mice, track balls, touch screens, or the like.

Document processor interface 222 is suitable for data communication with MFP functional units 250. In the illustrate example, these units include a copy engine, suitably comprised of copy hardware 240, a scan engine, suitably comprised of scan hardware 242, a print engine, suitably comprised of print hardware 244 and a fax engine, suitably comprised of fax hardware 246. These subsystems together comprise MFP functional hardware 250. It will be understood that functional units are suitably comprised of intelligent units, including any suitable hardware or software platform.

Figure 3:
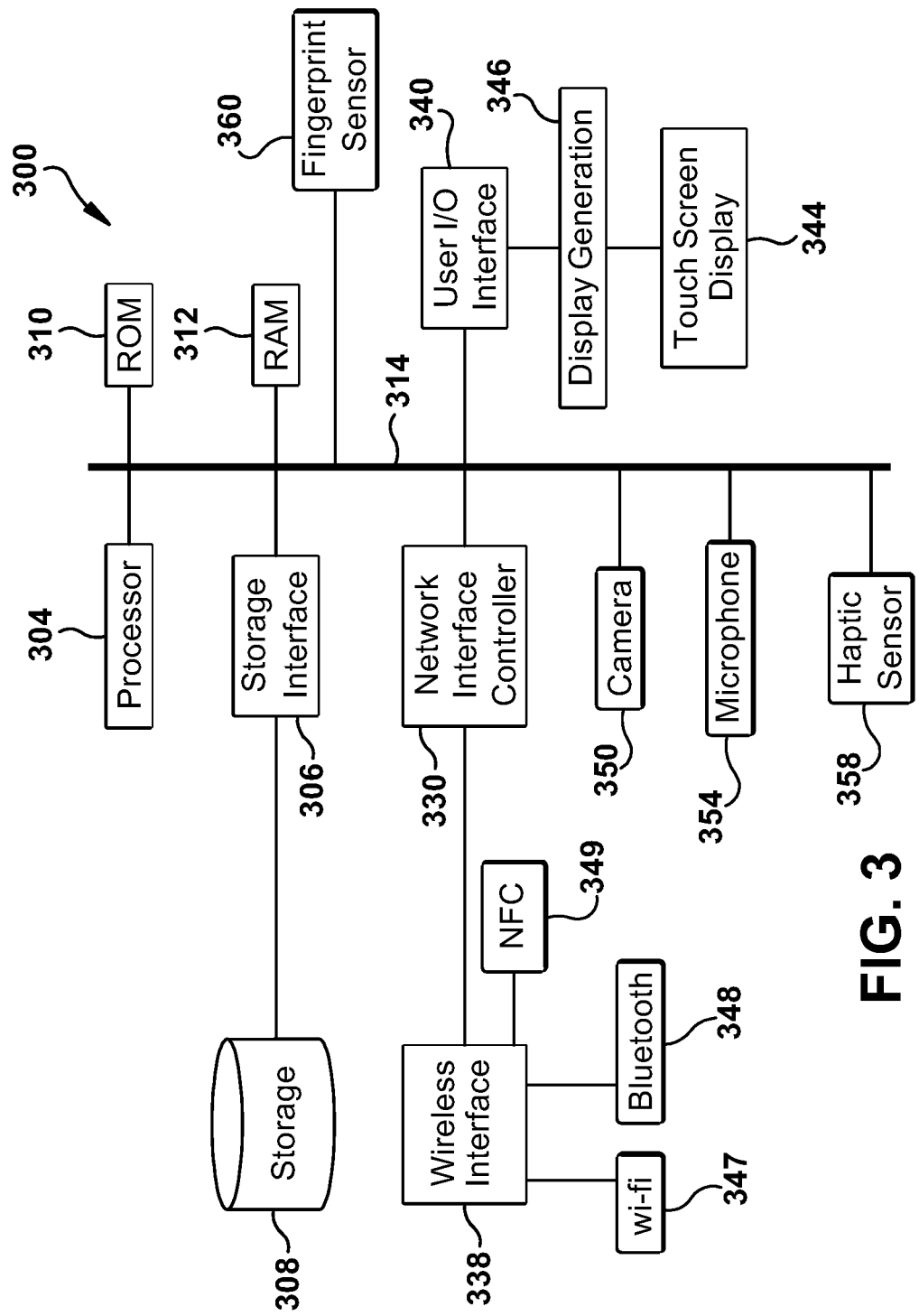
FIG. 3 is an example embodiment of a digital device such as a smartphone, laptop or a tablet.

Turning now to FIG. 3, illustrated is an example of a digital device system 300 suitably comprising smartphone 124 or server 120 of FIG. 1. Included are one or more processors, such as that illustrated by processor 304. Each processor is suitably associated with non-volatile memory, such as read only memory (ROM) 310 and random access memory (RAM) 312, via a data bus 314.

Processor 304 is also in data communication with a storage interface 306 for reading or writing to a data storage system 308, suitably comprised of a hard disk, optical disk, solid-state disk, or any other suitable data storage as will be appreciated by one of ordinary skill in the art.

Processor 304 is also in data communication with a network interface controller (NIC) 330, which provides a data path to any suitable network or device connection, such as a suitable wireless data connection via wireless interface 338. A suitable data connection to an MFP or server is via a data network, such as a local area network (LAN), a wide a rear network (WAN), which may comprise the Internet, or any suitable combination thereof. A digital data connection is also suitably directly with an MFP or server, such as via BLUETOOTH, optical data transfer, Wi-Fi direct, or the like.

Processor 304 is also in data communication with a user input/output (I/O) interface 340 which provides data communication with user peripherals, such as touch screen display 344 via display generator 346, as well as keyboards, mice, track balls, touch screens, or the like. It will be understood that functional units are suitably comprised of intelligent units, including any suitable hardware or software platform.

Network interface 338 suitably provides wireless data communication via Wi-Fi interface 347, Bluetooth interface 348 and NFC interface 349. Also in data communication with processor 304 is camera 350, microphone 354, haptic sensor 358, and fingerprint sensor 360.

Figure 4A:
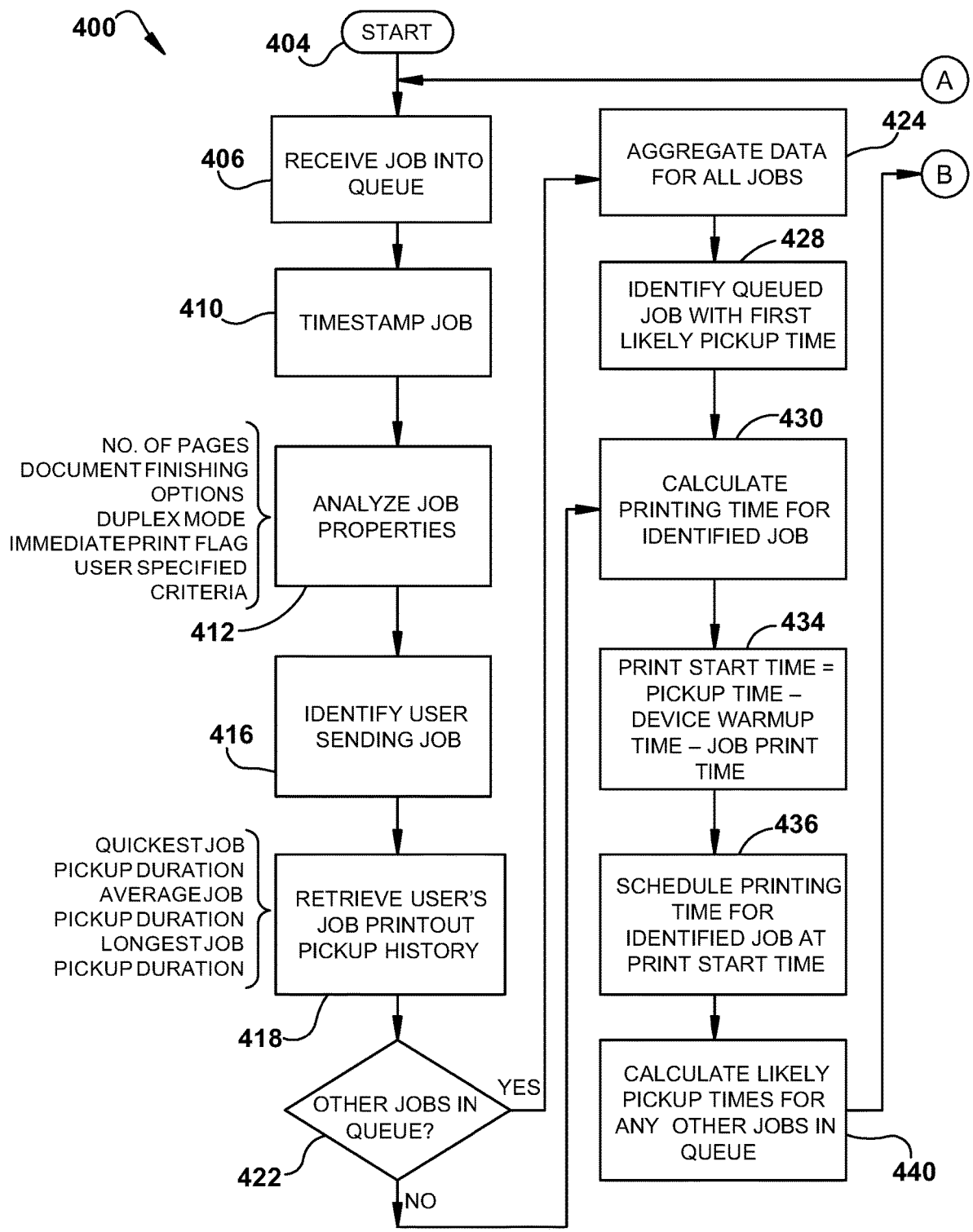
FIGS. 4A and 4B is a flowchart of an example embodiment of a system for device power saving via intelligent print queuing.
Figure 4B:
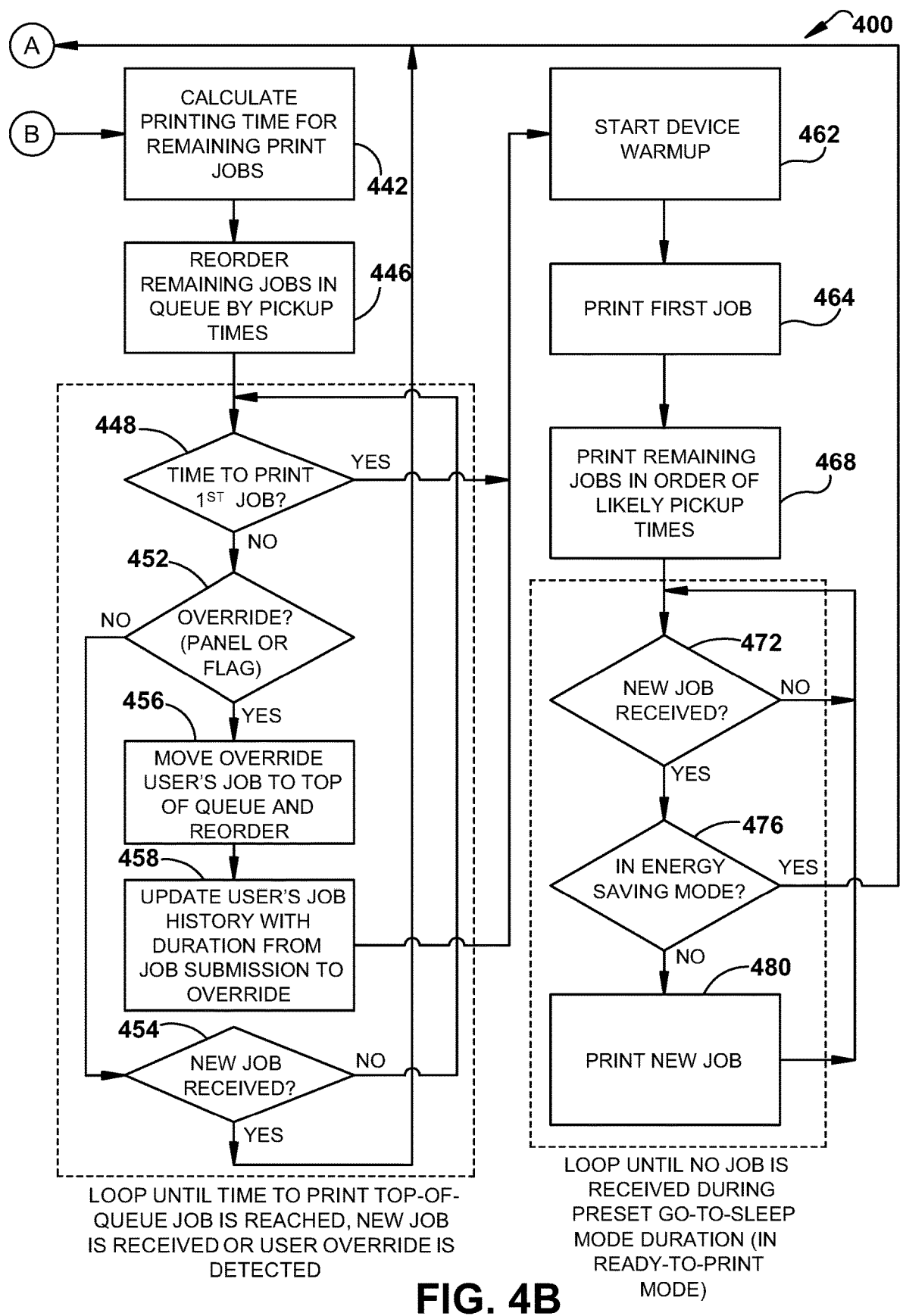

FIGS. 4A and 4B comprise flowchart 400 of an example embodiment of a system for device power saving via intelligent print queuing. The process commences at block 404 and proceeds to block 406 when a print job is received into a print queue. The incoming job is timestamped at block 410 and properties of the job are analyzed at block 412. Properties include a number of pages, document finishing options, such as collating, hole punching, stapling, or the like. Other job properties include duplex or simplex mode printing, or any other suitable criteria, such as user supplied criteria. Such analysis provides data from which a print completion time can be determined once a print operation has been commenced. A job may also include a user instructions, such as being flagged for immediate printing. Next, at block 416, a user associated with sending the job is identified. Next, prior printing history associated with that user is retrieved and determined at block 418. A user's history may include their quickest printout pickup time, average job pickup time, longest job pickup time, or the like. For example, a particular user may send print jobs during the day, and habitually pick up all of their jobs at the end of the workday. Another user may pick up jobs each day right before lunch. Still other users may typically pickup jobs within minutes of sending them. Pickup times are suitably determined by MFP panel commands to print a job, or by determining when a user is proximate to an MFP, as detailed above. A pickup time is suitably measured from a timestamp for their document as provided at block 410, as noted above.

The system then proceeds to block 422 to determine if any other jobs are resident in the queue. If so, data for all queued jobs is aggregated at block 424 and a prioritized job identified as that queued job most likely to be picked up first at block 428. A printing time, or time to print that job is determined at block 430. If no other job is determined to be in the queue at block 422, the system suitably proceeds directly to block 430 and a print time is calculated for that job.

When a prioritized print job print time is determined at block 430, a print start time is determined at block 434. The start time is calculated by subtracting a device warmup time and job print time from an anticipated pickup time, and that calculated time is set for printing the prioritized job at block 436. In this fashion, if the user associated with the prioritized job follows their customary pattern, the device will warmup, their entire document will be printed, and the printed document will be await pickup at the user's customary pickup timing.

Next, likely pickup times for other jobs in the print queue are calculated at block 440, and print times are calculated for any remaining jobs that are simultaneously in the queue at block 442. These other jobs are reordered in the queue by their anticipated pickup timing at block 446. Next, a check is made at block 448 to determine if it is time to print the prioritized job. If not, a check is made at block 452 if a user override for any document in the queue exists, either by user selection with an MFP interface, or by a flag set with a print job. If no override is present, a check is made as to whether any new job has been queued at block 454. If so, the process returns to block 406. If not, the process returns to block 448. If a user override is determined at block 452, the associated job is moved to the top of the print queue at block 456, and that user's print history is updated at block 458 to include the timing from their job submission to their override pickup. Thus, the user's history can be updated to reflect user patterns as they change or evolve. Once the override has been detected and the associated document prioritized, an MFP warmup is commenced at block 462 and the prioritized job printed at block 464. Insofar as the MFP is now in ready-to-print mode, having left standby or power saving mode, all remaining queued jobs are printed in their prioritized order at block 468. A check is made at block 472 to determine if a new job has been received into the queue. If not, the process makes repeated checks for incoming documents at block 472. At such point a new document is received, a check is made at block 476 to determine if the MFP is in energy saving mode. If not, no device warmup is required so the incoming job can be printed immediately at block 480. Such printing suitably restarts a timer to restart a preset inactivity duration wherein the MFP will reenter power saving mode. If a new document is receive into the queue when the MFP is in power saving mode, the process returns to block 406. As described, a power saving system is provided that maximizes power saving mode time, with minimal wait times for users.

Figure 5:
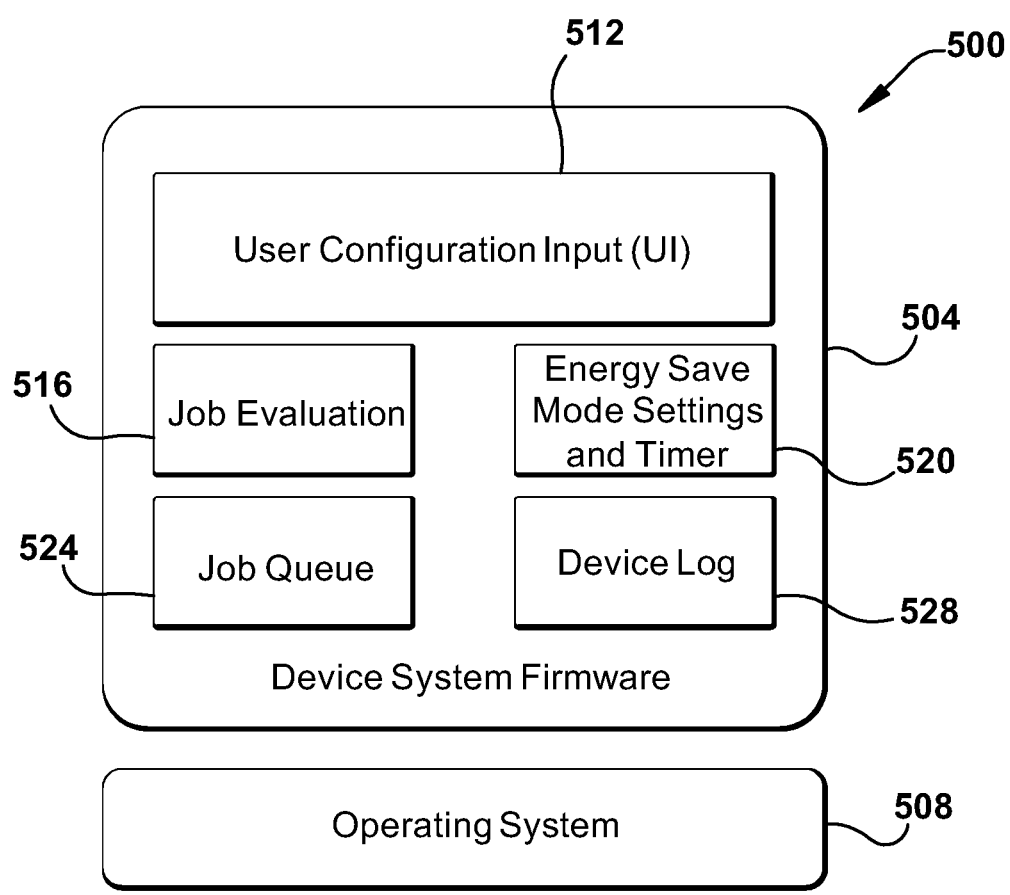
FIG. 5 is an example embodiment of a software module.

FIG. 5 illustrates an example embodiment of a software module 500 commensurate with the forging. Device software 504, suitably comprised in whole or in part of device firmware, includes a user configuration input (UI) 512, a job evaluation module 516, energy saving mode settings and timer module 520, job queue 524 and device logs 528. Device software 504 suitably runs on operating system 508.

Figure 6:
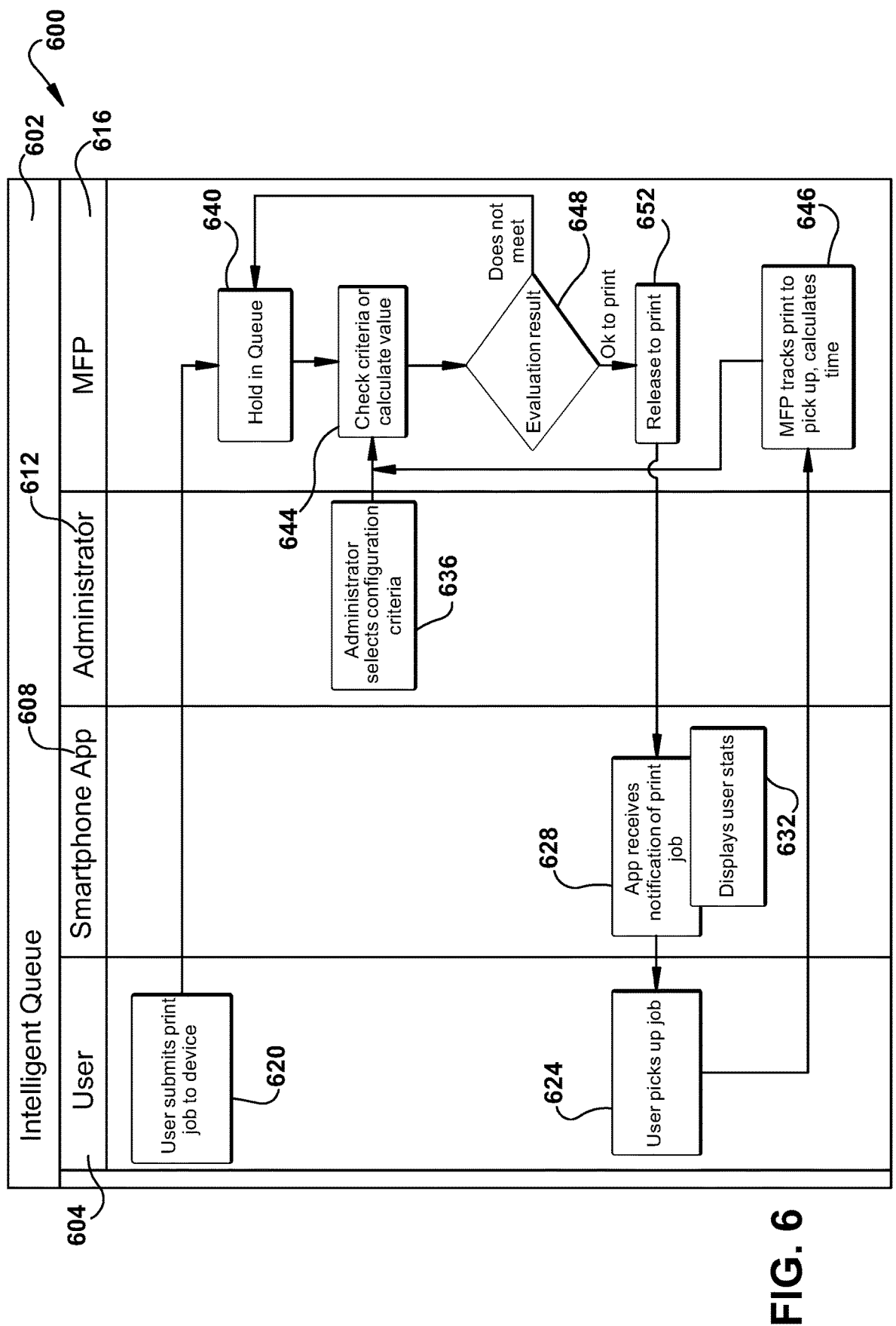
FIG. 6 is an example embodiment of device power saving via an intelligent print queue.

FIG. 6 is a flow diagram 600 of an example embodiment for device power saving via intelligent print queue 602 showing interaction between a user 604, smartphone app 608, administrator 612 and MFP 616. Activities of user 604 include submitting a print job at block 620 and picking up an ensuing printout at block 624. Smartphone App 608 activities include receiving notification of a print job at block 628, suitably by smartphone text message, and a display of user statistics at block 632. Thus, a user may be prompted to pick up their print job since it has already been printed. Such display informs a user as to their earlier printout pickup habits which may lead them to deferred job pickup, such as when they are aware that their job will not be printed as of yet. Activities of administrator 612 includes setting configuration data at block 636. Such configuration data may set criteria such as what user characteristics are used, such as their earliest pickup time or their average pickup time. An administrator may also select a modified duration, such as a conservative printout timing ten minutes earlier than calculated, or immediate or prioritized printing for certain users. An administrator may also set other criteria, such as how long a duration from a last printout until an MFP reenters power saving mode.

Activities of MFP 616 include holding jobs in a queue at block 640, checking print criteria at block 644, suitable including administrator settings from block 636 and printing and pickup times from block 646, suitably updated when a user picks up their job at block 624. MFP evaluates criteria at block 648, and returns to block 640 when criteria are not met, and releases job(s) to print at block 652 when criteria are met.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a processor;
a memory storing a print job queue and further storing, for each of a plurality of users, history data corresponding to an associated user's printed document pickup time relative to their print job transmission time; and
a network interface configured to received print jobs into the queue, including a first print job associated with a first user,
wherein the processor is configured to determine an anticipated pickup time for a printout of the first print job in accordance with history data associated with the first user,
wherein the processor is further configured to schedule printing of the first print job in accordance with a determined job pickup time,
wherein the network interface is further configured to receive at least a second print job into the print queue,
wherein the processor is further configured to determine an anticipated pickup time for each additional print job received into the print queue in accordance with history data associated with a sender of each additional print job, wherein the processor is further configured to reorder the print queue such that a print job with an earliest anticipated pickup time is at a top of the queue, wherein the processor is further configured to reorder all jobs in the print queue in order of anticipated pickup times each time a new print job is received into the print queue, and wherein the processor is further configured to print all jobs in the print queue once a print operation is commenced on a document at the top of the queue.

2. The system of claim 1 wherein the print operation is commenced immediately responsive to a user override input.

3. The system of claim 2 wherein history data associated with a user providing the user override input is updated in accordance with receipt of the override input.

4. The system of claim 1 wherein the anticipated pickup time is further determined in accordance with a property of the print job or a printer warmup time.

5. The system of claim 1 wherein the processor is further configured to schedule immediate printing of the first print job when an associated printer is in a ready-to-print state.

6. A method comprising:
storing a print job queue in a memory;
storing in the memory, for each of a plurality of users, history data corresponding to an associated user's printed document pickup time relative to their print job transmission time;
receiving print jobs into the queue, including a first print job associated with a first user;
determining an anticipated pickup time for a printout of the first print job in accordance with history data associated with the first user;
scheduling printing of the first print job in accordance with a determined job pickup time;
receiving at least a second print job into the print queue;
determining an anticipated pickup time for each additional print job received into the print queue in accordance with history data associated with a sender of each additional print job;
reordering the print queue such that a print job with an earliest anticipated pickup time is at a top of the queue;
reordering all jobs in the print queue in order of anticipated pickup times each time a new print job is received into the print queue, and
printing all jobs in the print queue once a print operation is commenced on a document at the top of the queue.

7. The method of claim 6 further comprising commencing an immediate print operation responsive to a user override input.

8. The method of claim 7 further comprising updating history data associated with a user providing the user override input in accordance with receipt of the override input.

9. The method of claim 6 further comprising determining the anticipated pickup time in accordance with a property of the print job or a printer warmup time.

10. The method of claim 6 further comprising scheduling immediate printing of the first print job when an associated printer is in a ready-to-print state.

11. A multifunction peripheral comprising:
a processor;
a memory storing a print job queue, the memory further storing, for each of a plurality of users, history data corresponding to an associated user's printed document pickup time relative to their print job transmission time;
a print engine having a standby state and a ready-to-print state; and
a network interface configured to received print jobs into the queue, each received print job associated with a user,
wherein the processor is configured to immediately commence a printout of all print jobs in the queue when the print engine is in the ready-to-print state;
wherein when the print engine is in the standby state, the processor further configured to
determine an anticipated pickup time for printouts of each received print job in accordance with the history data for each user associated with a received print job,
reorder print jobs in the queue such that a prioritized print job having an earliest anticipated printout pickup time is at a top of the queue,
schedule a printing operation such that the prioritized print job is printed prior its anticipated pickup time, and
commence an ordered printing of all print jobs in the queue following a printing of the prioritized print job.

12. The multifunction peripheral of claim 11 wherein the processor is further configured to commence a warmup of the multifunction peripheral to place it in the ready-to-print state prior to printing the prioritized print job.

13. The multifunction peripheral of claim 11 wherein the processor is further configured to reorder the print jobs in the print queue such that each print job is printed in order of its associated anticipated pickup time.

14. The multifunction peripheral of claim 11 wherein the processor is further configured to immediately commence printing upon receipt of an override instruction prior to a scheduled printing operation.

* * * * *